B. W. HEYMAN.
ARTIFICIAL SNOW.
APPLICATION FILED JAN. 20, 1915.
1,162,060.
Patented Nov. 30, 1915.
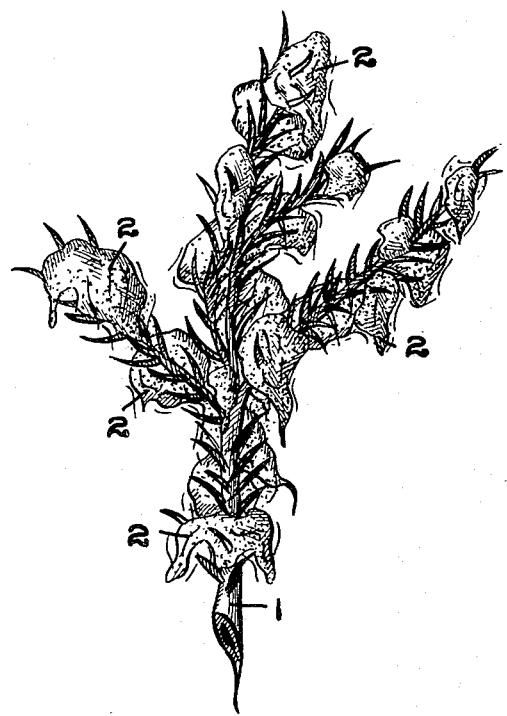

UNITED STATES PATENT OFFICE.

BENJAMIN W. HEYMAN, OF PHILADELPHIA, PENNSYLVANIA.

ARTIFICIAL SNOW.

1,162,060.   Specification of Letters Patent.   Patented Nov. 30, 1915.

Application filed January 20, 1915. Serial No. 3,301.

*To all whom it may concern:*

Be it known that I, BENJAMIN W. HEYMAN, a citizen of the United States, residing at Philadelphia, in the county of Philadelphia and State of Pennsylvania, have invented certain new and useful Improvements in Artificial Snow, of which the following is a specification.

My invention relates to improvements in artificial snow, the object of the invention being to provide an artificial snow which is designed for use in connection with Christmas trees or for other purposes, which gives the appearance of snow, and is therefore ornamental and attractive in appearance.

A further object is to provide an improved composition which, when properly mixed with water, results in a white foam or lather, and may be applied to a Christmas tree or other object by means of a brush or dabber of any sort, and which will adhere to the tree and give the appearance of snow thereupon.

With these and other objects in view, the invention consists in certain novel ingredients in the composition and in the application of the same as will be more fully hereinafter described and pointed out in the claims.

The accompanying drawing is a perspective view of a fragment of Christmas tree 1, showing my improved artificial snow 2 thereupon.

To form the composition, I mix soap and glycerin with sufficient water to permit a thorough mixture. A preferable proportion I find to be as follows:—soap, one ounce; glycerin, one-half ounce; and sufficient water to make a six ounce composition. In addition to the above, I may add a glistening material such as finely ground mica.

The composition when ready for the market is of a gelatinous nature, and when ready for use, is mixed with water and beaten or agitated so that it increases greatly in volume and forms a pure white foam or lather which is dashed upon the tree in any desired manner.

The composition readily adheres to the foliage and branches of the tree, and gives the appearance of snow, remaining for an indefinite period of time, substantially the same in volume and appearance, when dry.

A brush, or the beater employed for mixing, can be utilized to dash the composition onto the branches of the tree, and will be self-sustaining when once applied.

Having thus described my invention, what I claim as new and desire to secure by Letters Patent is:

1. The herein described composition of matter consisting of soap, glycerin, and a glistening material insoluble in water, substantially as described.

2. The herein described composition of matter consisting of soap and glycerin in substantially the proportions of two parts soap to one of glycerin, mixed with finely ground mica and water, substantially as described.

In testimony whereof I have signed my name to this specification in the presence of two subscribing witnesses.

BENJAMIN W. HEYMAN.

Witnesses:
L. P. MOYER,
S. W. FOSTER.